United States Patent [19]

Barbanell

[11] Patent Number: 5,095,194
[45] Date of Patent: Mar. 10, 1992

[54] HOLOGRAPHIC CREDIT CARD WITH AUTOMATICAL AUTHENTICATION AND VERIFICATION

[76] Inventor: Joseph Barbanell, 1945 Contra Costa Blvd., Pleasant Hill, Calif. 94523

[21] Appl. No.: 420,816

[22] Filed: Oct. 12, 1989

[51] Int. Cl.$^5$ .............................................. G06F 15/30
[52] U.S. Cl. .................................. 235/379; 235/457; 382/4
[58] Field of Search .................... 235/379, 457; 382/2, 382/4, 31; 350/3.6, 3.68; 356/71

[56] References Cited

U.S. PATENT DOCUMENTS

| | | | |
|---|---|---|---|
| 3,716,301 | 2/1973 | Caulfield | 356/71 |
| 4,837,843 | 6/1989 | Owechko | 382/31 |
| 4,860,253 | 8/1989 | Owechko | 350/3.6 |
| 4,876,725 | 10/1989 | Tomko | 382/2 |
| 4,961,615 | 10/1990 | Owechko et al. | 350/3.68 |

Primary Examiner—Harold Pitts

[57] ABSTRACT

A holographic credit card that uses a matched optical filter to store in form of a hologram a unique identification such as a fingerprint of the authorized user, a source of coherent light that provides the illumination, and the input element in the approval device for providing the angle-invariance, possessing the form of the transparent window, against which the user places and rotates the same fingerprint, and the registering device for registering the correlation optical signal between the stored fingerprint and presented fingerprint to generate a signal to activate the device when, and only if, a positive correlation exists between the presented and the registered fingerprints. A two-stage holographic credit card using the "generalized matched optical filter", wherein the additional information for authorization is stored in the reference beam during the preparation of the said filter, the angular invariance is provided by the said means and the means of second-stage approvement, utilizing the existing banks communication lines, are also provided. A three-stage holographic credit card, using the "generalized matched optical filter", wherein the additional information for verification is stored in the reference beam during the preparation of the said filter, the angular invariance is provided by the said means, the means for bank's computer approving procedures, including the automatic feedback are provided, and the means of additional second-stage optical comparison are also supplied.

9 Claims, 5 Drawing Sheets

HOLOGRAPHIC CREDIT CARD WITH AUTOMATICAL AUTHENTICATION AND VERIFICATION

BACKGROUND OF THE INVENTION

Main advantages of the banking system, utilizing the said credit card are as follows:

a. The card is simple and inexpensive in production.

b. The card and approving device are universal and simple in use.

c. The card, being devoid of any surface information, provides the unambiguous, automatic, real-time authentication and verification of the user. The probability of accidental misuse is no higher then $10^{-7}$.

d. The card is absolutely foolproof from stealing.

e. In combination with the suggested techniques the system becomes absolutely protected from forging, even if the principle of the card protection is known. The forging can be realized with information from the bank computor memory only.

f. The approval device is small, self-consistent, universal and unexpensive. Being realised in the form of solid-state optics, it can be incorporated in all the applications, including even personal phone-sets, paid-phones, bar-code counters, etc.

g. The card can include the additional sheltering information of any degree of graphical complexity. Said information doesn't affect either time or complexity of the card itself, the approval device, or authorization time.

h. All the approval procedures in all the applications are absolutely automatic and the existing communication channels/lines for banking information are being utilized.

Fingerprint being the most representative and informative natural object numerous attempts were made to incorporate it in recognition devices.

Some number of correspondent inventions and patents exist, some of them recently granted.

The said patents can be divided into two main categories: with computer correlation and with elements of optical processing.

Devices from the secondary category even include in some cases coherent sourse of illumination (see, for instance, Hartwig Ruell, U.S. Pat. No. 4,532,508).

In the computerized recognition systems with fingerprint as the approval element (see, for instance, Arthur B. Carrol, et al., U.S.Pat. No. 4,684,801) the input fingerprint is usually introduced to the display window and scanned. The scanned data is then directed to the processor and compared with the set of fingerprints, already being stored.

One should realise that the informational volume for such informative object as fingerprint usually demand all operative memory of processor. So the prestored fingerprints use the long-time storage media (discs, tapes, etc), needed data being introduced on demand. Corresponding time lapses exist even for the most powerfull computers and are usually not mentioned in these patent claims.

In some of the patents the elements of coherent processing are indirectly used, even for the credit card approval (see Paul B. Elmes, U.S. Pat. No. 4,455,083), though in them the said elements are utilized in fingerprints superimposing only, the advantages of Fourier spectra analysis not incorporated.

In all the recently claimed of these patents the main problem of authentication—positioning of fingerprints—is silently realised. Inventors are trying to bypass it with the variety of different means, including the rotation of light source (Paul A. Hakenewerth, U.S. Pat. No. 4,684,802), scanners of different levels of complexity (see Robert F. Bunn, U.S. Pat. No. 4,641,350), means for mechanical rotation of the fingerprints, and even including the grooves for input fingerprint positioning.

It should be noted here, that for computerized systems, the said positioning of the fingerprints is being realized electronically, each new position of the input fingerprint being treated as the new input object. This either increases greatly the processing time, or—the rather elaborate and time consuming algorithms are being incorporated.

In the mostly recent granted patents, utilizing the holographic storage and even the "modulated reference wave", (see U.S. Pat. Nos. 4,532,508, and 4,385,831) the possibilites and advantages of coherent processing are not employed, correlation procedures not being optically incorporated.

The task being very attractive, some optical systems utilize the fiber-optics elements (Robert F. Dowling, U.S. Pat. No. 4,785,171) and, independently the patents for non-optical fingerprint recognition systems exist (see Otmar Kern, U.S. Pat. No. 4,541,112; David G. Edwards, U.S. Pat. No. 4,429,413).

All the mentioned disadvantages are being eliminated in the system under claim. Due to application in it by the very simple and real-time procedures, the spatial invariance and multi-step fully optical correlation procedures are incorporated.

The system under claim uses for synthesizes the previous numerous publications of the inventor (see, for instance J. S. Barbanell, Analysis of optical correlator for fingerprints, Papers of Institute of Radioengineering, p.202, 1972, Leningrad; J. S. Barbanell. Autometry, #5, 14, 1975, J. S. Barbanell et. al, invention certificates: #312,282, 1968, Lenseless Optical Correlator for Fingerprints, #528,605 and 528,611 (1980)-Coherent Matched Filter with Optical Feedback).

SUMMARY OF THE INVENTION

This invention relates in general to credit cards banking systems and in particular to an automatic holographic credit card with automatical verification by the user, utilizing known coherent pattern recognition techniques.

The primary object of the present invention is to provide a a foolproof system for authentication of the said credit card, possessing the input element that provides a real-time angular-invariant unique identification of an authorized user, such as a fingerprint or other unique identification, to approve the credit card on the first stage.

A further object of the invention is to provide an inexpensive holographic credit card which utilizes holographically encoded particular fingerprint of an authorized user which is optically continuously compared to the presented rotating fingerprint and which authorizes the command signal to the bank computer only when the presented fingerprint correlates with the stored fingerprint.

A further object of the invention is to provide holographic credit card in which the stored fingerprint of the authorized user may be readily changed by the user.

A further object of the invention is to provide, in one embodiment, triple automatic authentication such as a first level requiring the fingerprint of the authorized user, a second level requiring the digital information to be automatically compared with the one stored in bank computer memory and on third, by command feedback signal from the latter, requiring the graphical information from the authorized user (in the form of signature—or digits) and utilizing also the additional means of optical comparison for the credit card approvement device to be activated.

A further still object of the invention is to provide for the said triple-stage procedure the means of secure supplying the said graphical information, utilizing the standard computer display, with required information to be introduced from the standard keyboard, the third-level authorization realised by the "reflectance input".

Further objects and advantages of the invention will become apparent from the following description and the drawings.

DETAILED DESCRIPTION

Figure 1:
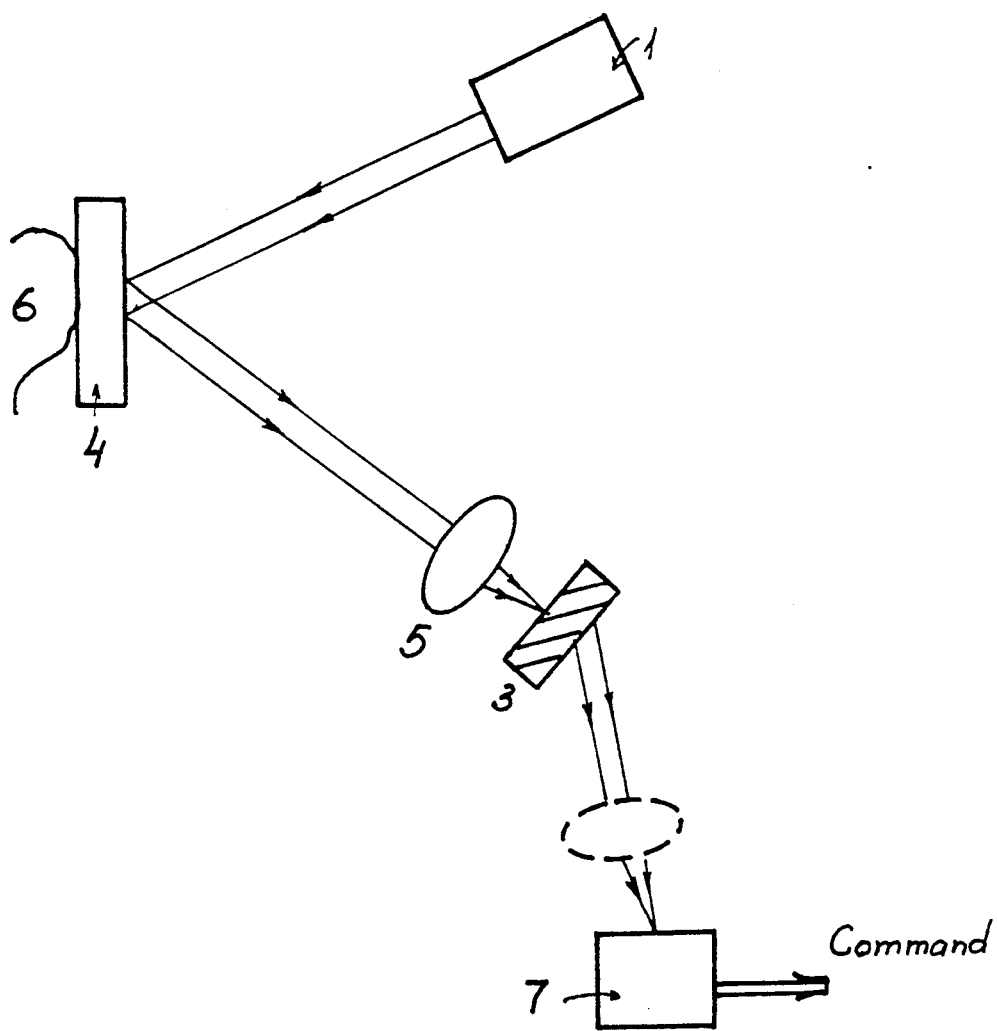
FIG. 1 is a schematic representation of the holographic credit card approval system according to the present invention.

The holographic credit card approval device shown in FIG. 1 may be incorporated in any sort of applications of financial transactions. The claimed devices possessing automatical foolproof authorization, all the said transaction can be realized automatically. In the following description, for the sake of clearness, functioning of the claimed system is explained on the example of standard Day and Night Teller (DNT). In other applications all the basical principles are preserved.

The system under claim includes a source of coherent light as for example a laser 1. In low cost implementation, the source of coherent light for the authentication step may be a source of partially coherent light such as a neon lamp. (During the step of recording the fingerprint holographically, the coherent light-source should always be used.) Thus the phrase "coherent light-source" used here includes both coherent and partially coherent light. Use of a laser provides a very small probability of error at a significant cost compared to a neon lamp but is justified in many applications of the invention by the said probability of error.

The usage of holographically encoded (conjugate) Fourier transforms (and not the images themselves) is fully justified and not discussed here, as the practice being discussed in detail is already approved and widely realized in the numerous applications of the pattern recognition techniques. Some advantages should be named such as the invariance of the in-plane filter's orientation. Also, using such an informative object as the fingerprint, only about 1% of initial fingerprint is needed for assured recognition.

The holograms themselves are being applied in the credit cards production. Those used, though, are thick-layer art holograms, does not carry any functional obligations and are used for fashion and art purposes only.

Claimed card and the corresponding means provide inexpensively both the card and corresponding additional approvement devices for the universal automatic and global banking system. The latter incorporates the existing communication channels, thus representing the most attractive features in the terms of additional investments—the implementation of the new or different channels being mostly expensive.

The card and approvement system under claim with fiber optics communication channels, its advantages becoming increasingly profitable—then the inverse transform "light-electrical signal" can be produced in the bank computer.

Claimed credit cards, being used in the payed phones, for instance, the second- and third-level approvement information, being small in volume, can be directed to the bank computer by the same phone line.

The card is immediately compatible with the existing Bar Code Scanners, the purchase procedures becoming automatic and foolproof. The compatibility is readily realised, the Bar Scanners already possessing lasers and auxilliary equipment. The differences will be represented by one/two miirors and spherical lens only.

The system under claim, being inexpensive, automatic, universal and foolproof both from misuse or forging, can find immediate implementation in compatibility with the UNICARD, which is being incorporated now.

In the said cards, which already utilize the microprocessor and input keyboard, the one- or two-level devices under claim can be readily incorporated. Mentioned above the very low probability of false recognition provides the needed security and makes both the card foolproof from misuse and the personal code obsolete.

Procedures being discussed below are utilized in coherent pattern recognition techniques, but in all the applications of the latter, the main problem is that the accuracy of recognition (approvement) is greatly dependent on the placement of the matched filter (or on the relative orientation of the input object and corresponding matched filter).

The recognition system (claimed holographic credit card approval system) is very sensitive to the relative angular orientation of the matched filter, being incorporated in the credit card itself and the object under recognition, i.e. the fingerprint of the user.

This produces the main and the biggest problem to the real-time automatic recognition in all the existing optical pattern recognition system. In the claimed system the inventor deals with the said problem in the most simple an efficient way.

To realize this procedure in the simplest way the approval (recognition) system includes the input element in the form of a transparent window 4. This element makes it possible to overcome the main disadvantages of prior similar systems by providing the means for the real-time angular matching of the spectra orientation that makes the system real-time functionable.

Against this element 4 the user places the tip of a particular finger 6 for identification purposes and, optionally, to activate the light source 1.

The light from the source 1 illuminates fingertip 6, and the light reflected from the fingertip as an encoded beam 2 passes through the spherical lens 5 which projects the said beam upon the matched filter 3, located at its shadow plane. Matched filter 3 represents the complex spatial Fourier transform of the image of the subject's fingerprint, having been produced with the coherent light on any suitable recording medium such as photographic, thermoplastic or photothermoplastic media.

The said filter is structurally included in the holographic credit card itself.

In use, the user rotates the fingertip 6 in order to align the Fourier-transform of introduced fingerprint with the stored holographic representation of the authorized fingerprint in matched filter 3, being located in the credit card, and in that way to eliminate the main, mentioned disadvantage of the system.

The correlation procedures are realized continuously in time until the images are angularly matched and the correlation signal is being formed.

The Fourier-spectrum comparison provides the invariance to the in-plane displacements of the introduced image and invariance to the in-plane scale differences. The chosen procedure provides automatically the formation of the correlation signal inside of the wavefront, the procedure being absolutely real-time, as a result of the implementation of the two-dimensional spatial comparison.

Two additional sources of displacement errors are treated as follows.

The correlation signal is greatly dependent on in-focal orientation of the matched filter 3. The latter is avoided by the following.

The filter should be fitted exactly in the back focal plane of lens 5 in the approvement device. That can be easily achieved by different methods. Only two of them should be itemized:

(a) The approval system is supplied with grooves, the produced holographic credit card possessing enough thickness and mechanical firmness to fit exactly in the latter. The said card being prepared in the accustomed form, on plastic, these requirements are easily achieved. It should be mentioned here, that the said filter, included in the card can be produced on the standard film—transmitting modification. Then—for the sakes of mentioned mechanial firmness, the innventor suggests the card to be covered with melted plastic. The latter should not be necessarily transparent in the visual wave-band. For the security increase the inventor suggest it to be transparent in different wave-band, the laser for read-out with corresponding light-wave supplied.

The filter can be realised in the reflecting modification also: with the use of phase holograms. In the latter case, the recognition (approval) procedure is totally unaffected by the mechanical damages to the card of any sort (except lamination): to the extent, that the card can be even scratched/scraped. This filter can be produced by the known bleaching procedures, or by mechanical printing on plastic card under the preparation.

(b) The system being optically reversible, the approval device itself is used for filter preparation.

The linear shifts (misplacements) of the matched filter in the back focal plane of the lens 5 absolutely do not affect the recognition procedure. This feature is used on the secondary levels of the suggested recognition procedure.

In the shadow plane of the matched filter 3 a photosensitive element 7 is located. Its output command signal is connected to a control device/element which approves the use of the said credit card on the first level of recognition.

For further functional improvement the device may additionally include a second spherical lens (shown by dotted lines) which is situated in such a way that the matched filter is in the front and the photodetector is in the rear focal planes of said lens correspondingly. The functions of said lens are to focus the signal of correlation, is any, on the surface of photodetector.

The correlation signal's orientation in the said plane is unambiguously defined by the angular orientation of the reference beam during the stage of the matched-filter preparation. The correlation optical signal, if any, appears in the exact geometrical point of the said back focal plane. This can additionally serve as a protective measure, while the angle of reference wave orientation is being kept secure. This feature can be utilized in the second-level procedure, discussed below.

Thus the photoelement 7 can be located in the fixed position, and the optical part of the approval device becomes easily realizable in the form of the solid-state optics.

Photoelement 7 serves the purpose of registering the formed correlation signal and generates the electrical output command signal when the correlation signal between the stored and introduced fingerprints is present. As the correlation signal in the single stage approval device will always be a bright spot (plane reconstructed wave, or the Delta-function after additional focusing), it can be registered by the simple and inexpensive photosensitive means.

In a recognition mode of operation, the user insert his holographic credit card in the corresponding standard slit. The card being iserted, it activates the laser. It also can be activated by pressing the user's finger against the transparent window 4. The reflected light beam 2, being modulated in amplitude by the said fingerprint 6, passes through the spherical lens 5, which forms its complex Fourier spectrum in the plane of matched optical filter 3. After lase activation the user rotates his finger against transparent window 4, until the spectra coincide angularly. If the spectra additionaly match, and only then, the correlation signal in the form of a bright spot appears on the surface of photodetector 7.

The position of the said spot, if any, is unambiguously predetermined.

The process can be further improved by focusing the said correlation signal. To achieve this a second focusing lens is added (shown by the dotted lines). It is situated in such a way that the matched filter is in the forward focal plane and the photosensor is in the rear focal plane of the said second lens. The said photosensitive element 7 then generates the command electrical signal as previously described.

By utilizing the user's fingerprint as the source of authentication, the probability of error is of the order of 1 in 10,000,000. Using this feature the device will still be functional even if only a small part of the fingerprint is presented.

The recognition procedure is a real-time one and can be realized with the speed of 10E-8 second.

The present invention eliminates the main problem of similar prior devices, and that is the extreme sensitivity of the system to the input fingerprint/filter relative angular orientation. This problem is solved by the chosen input element—a transparent window 4 against which the user rotates his finger. This causes the rotation of the corresponding spectrum in the plane of matched filter 3 until the position of angular coincidence is achieved. Then and only then the correlation peak is formed.

Rotation of the input fingerprint can be formally represented as a sequence of separate recognition steps, each one being realized with practically unlimited speed. In other words, the user can rotate his finger with any speed he likes.

It should be noted that using self-developing registering media for the matched filter, the user himself, fully automatically, can prepare the needed filter using the claimed approval device.

The corresponding procedures are discussed in detail in the theory of optical matched filtering. The thing to be emphasized is that the claimed holographic credit card can be produced in a user-modifiable form, the memory for matched filters being long-time, changeable and realized on the reversible media optically.

Structurally, this changeability can be realized by adding an optical switch which activates the reference beam during credit card preparation. Such a switch can be connected to a knob on the outer side of the approval device, with an instructional indication such as "prepare", for instance.

Figure 2:
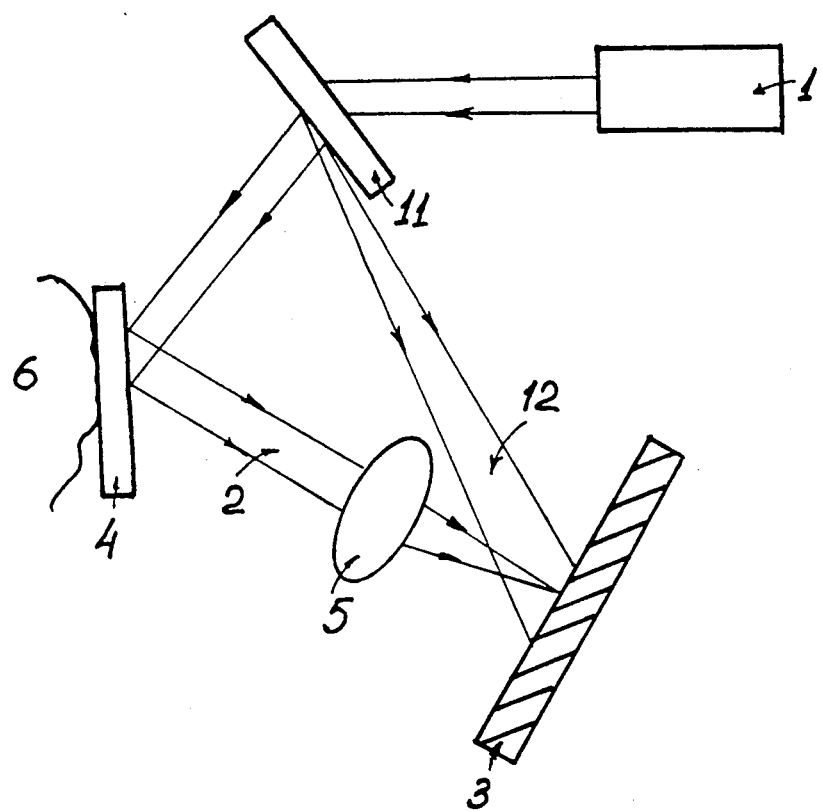
FIG. 2 is a schematic representation of the holographic credit card approval system additionally showing how the complex spatial Fourier transform of a fingerprint of an authorized user is registered by the user himself on the storage medium within the approval system.

Using the self-developing registering media and applying the recognized techniques, the named procedure can be made fully accomplished by the user himself. This is done by using the additions to the system shown in FIG. 2.

In actual preparation of the card in the said way, the user presses his fingerprint onto the input window of the lock, thus activating the laser. (He receives confirmation that the laser has been activated by the illumination of the said input window). Then the user switches on the "prepare" knob, the reference beam becomes activated, and the Fourier transform of his pressed finger is automatically implemented inside of the credit card in the form of a matched optical filter. After the knob is switched off, the card is absolutely ready and prepared for use—for the recognition (approval) proceedings.

If preferred, the conventional and accustomed procedure can be utilized for holographic credit card preparation. After the customer applies for the credit card, the company mails him the medium, on which the user presses his fingerprint and mails the imprint back. Then the card is manifactured, the described above holographical and Fourier transforms being implemented industrially. (This method is preferrable, when transform of a fingerprint is realised in a form of printed on plastic phase hologram).

Though the verification procedures are absolutely foolproof from mistakes within the limits of any known approving devices (with the stated earlier probability of errors), additional preventive measures can be easily suggested and incorporated.

Described credit card is absolutely foolprof from being stolen (or-misuses being stolen). The additional steps of verification serve the purpose of forge protection. All measures being utilized, the card can be forged with use of information from bank computer memory only (the latter being highly protected under all curcumstances).

For standard consumer needs, though, the inventor does not suggest their implemention, as the approval devices and procedures become increasingly complicated and expensive.

Said complexity should be understood in the relative terms—for the most sophisticated device will be approximately the same as DNT, mentioned before. These additional procedures does not leed to the complication of the card itself.

For the modified approval devices, to be referred as to the "two-stage" ones, the matched filter is prepared separately, the corresponding technique being very simple. In creating the two-stage approval, during the stage of matched filter preparation the so called "generalized hologram" technique is applied. that means that the reference beam includes an additional information carrier, whether transmitting or reflecting. (For instance, additional information can be introduced by computer display, the reference laser beam being reflected from its surface).

By incorporating the optical processing, the said information can be of any degree of graphic complexity. The simplest but most representative case of including a code word is discussed below. The latter is chosen by the inventor due to usual custom—the code word being the signature of the user.

Another suggested type of the sheltering information, is the digital sequense—in this case practically without the limitations—due to the opertional speed of the system. For instance, the said sequence can represent the account number of the user and can easily include 10-12 digits.

During the stage of matched filter preparation, the said sheltering graphical information the user is included in the reference beam (by means of a slide transparency, from the display, etc.). Then after the first stage of recognition is concluded (i.e., fingerprints match), in the predetermined position in the plane of the photodetector will appear not a bright spot, but the image of the chosen code word—the signature, the digital sequence, etc., having been previously included. (In this modification the additional focusing of the correlation signal is not needed).

This sheltering information is being read out consequently in time or space (by the photodetector matrix, for inst.) and directed through the already existing standard communication line to the bank computer. There it is compared to the sheltering information being previously incorporated in the credit card (in the reference beam of the spatial filter of it). If the informational sequences match, computer produces the decision about the required approvememt.

The advantages of suggested two-level approvement procedure are that the mostly informative object (fingerprint) is being compared optically, that leads to the high increase of the informational speed. Fingerprint being most informative, it's processing on the computer represents bit difficulties, the fingerprint possessing about of 2 Mbytes of informational volume.

Figure 3:
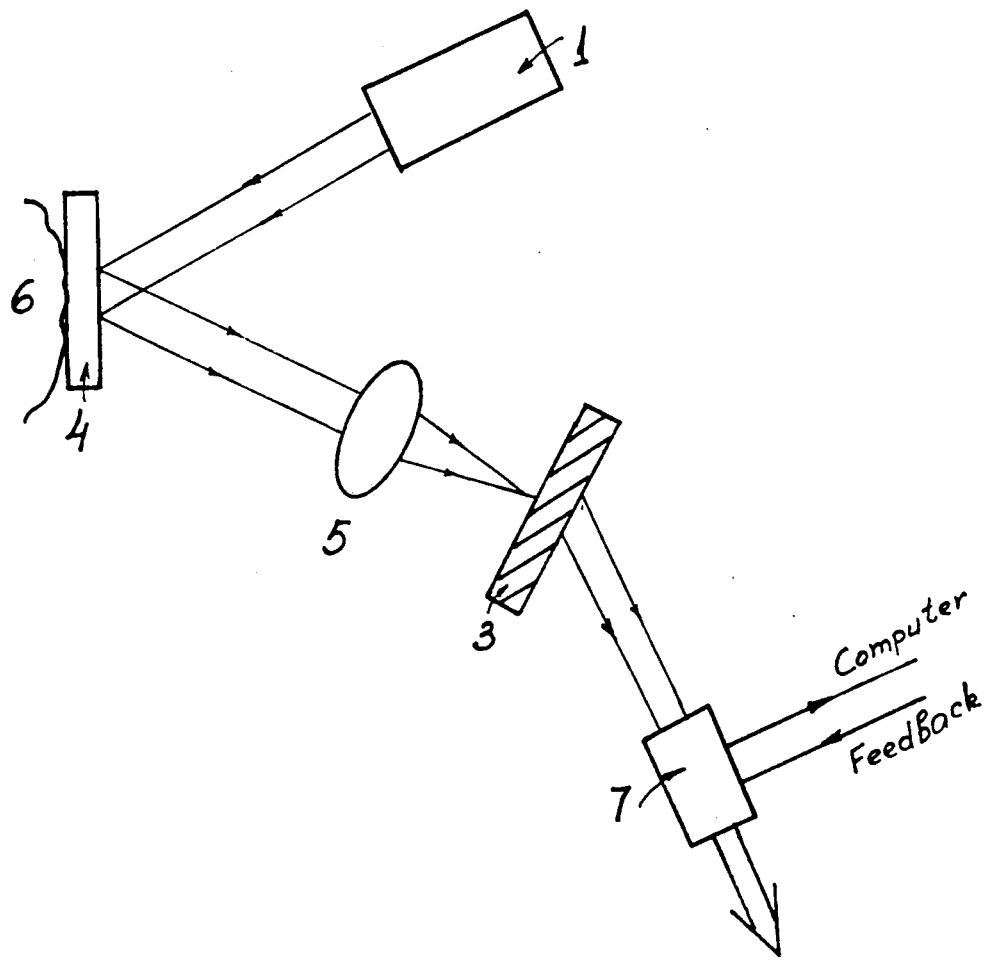
FIG. 3 illustrates schematically a second embodiment of the approving system which employs double authentication features.

This double-level verification system for the said credit card (see FIG. 3) includes the same elements, as the previously discussed, only ther connection to the bank computer through the existing communication lines is provided.

Utilizing the same principle (reference beam compression) the sheltering information can be included in the encoded form in the angle of propagation of the said beam on the step of filter preparation. Then on the reconstruction step, the correlation dot, if any, will appear in the exact spot of photodetector plane. The latter being realised in the form of the two-dimensional matrix, this information is being read out and directed through the communication line for computer comparison.

The system under claim provides the possibilites and means for yet further verification, if the said suggested double-level procedure does not provide the required security. (The probability of misuse of false recognition for such informative object as fingerprint is negligible-eith the stated before probability of error).

To exclude the probability of forging the triple-level system is claimed also.

This system uses further the advantages of optical processing and realizes by the feed-back computer signal, the optical correlation of the sheltering information itself.

Figure 4:
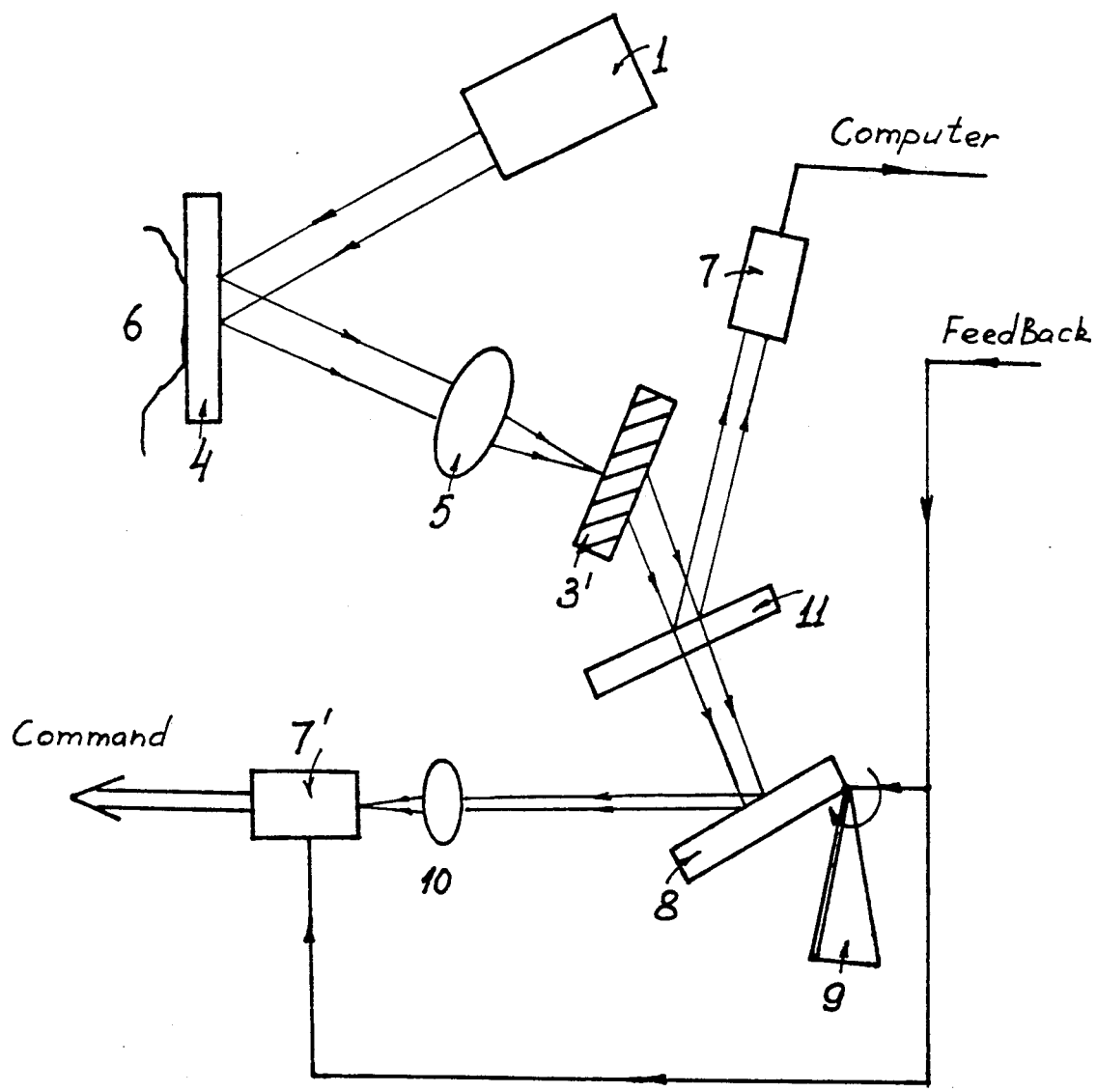
FIG. 4 illustrates schematically an embodiment of the approving system which employs employs the triple authentication features.

To realise this procedure an additional stage of optical filtering is added (FIG. 4). Using the same principle, this modification includes: 1-laser, 3-"generalized" matched filter, 4 and 8-input elements, 5 and 10-spherical lenses, 6-finger, 7-photoelement, with output connected to the control device.

In this modification (see FIG. 4), the holographic credit card approval system additionally includes the second input element 8, being situated on the path of the optical beam co-axically. This window posses This element serves the purposes of introducing in real-time the additiooal sheltering information by the user himself for optical comparison with the sheltering information, having been introduced in the reference beam of the filter.

After the first level (fingerprint) approvement is realised, and after the second level (computer) is realised also, in case of doubts, computer supplies the request—with the feedback signal through the same communication line.

The user can be informed by the sign "more information", for instance, fully in the same way, as the standard DNT functions. Then he introduces the second identification (signature, digital sequence, etc.) to the secong input element 8. The reconstructed after the first level reference wave, if any, is modulated secondarily by this additional information and is directed to the second spherical lens 10. Being correlated in the wave front, this combined sheltering information is optically focused on the surface of the second photodetector.

If the positive correlation exists (second bright spot) the second approval command signal is being supplied by the said photodetector 7'.

Realisation of the second input element dictates the alternative decision. For the sakes of better security it can be realised as the reflecting one—in the form of the display, being situated inside of the approval system. Then any printed or digital information can be introduced for optical comparison directly from the keyboard, user punching the corresponding keys, all the procedure being sheltered absolutely.

From other point of view, if more elaborate graphical information is chosen, the user canwrite it down on the second input element. The procedure being less secure (the information might be occasionally seen), it can be represented by the two-dimensional graphical information of any degree of complexity.

The latter does not affect the time of quality of third recognition step, it being realised optically.

Figure 5:
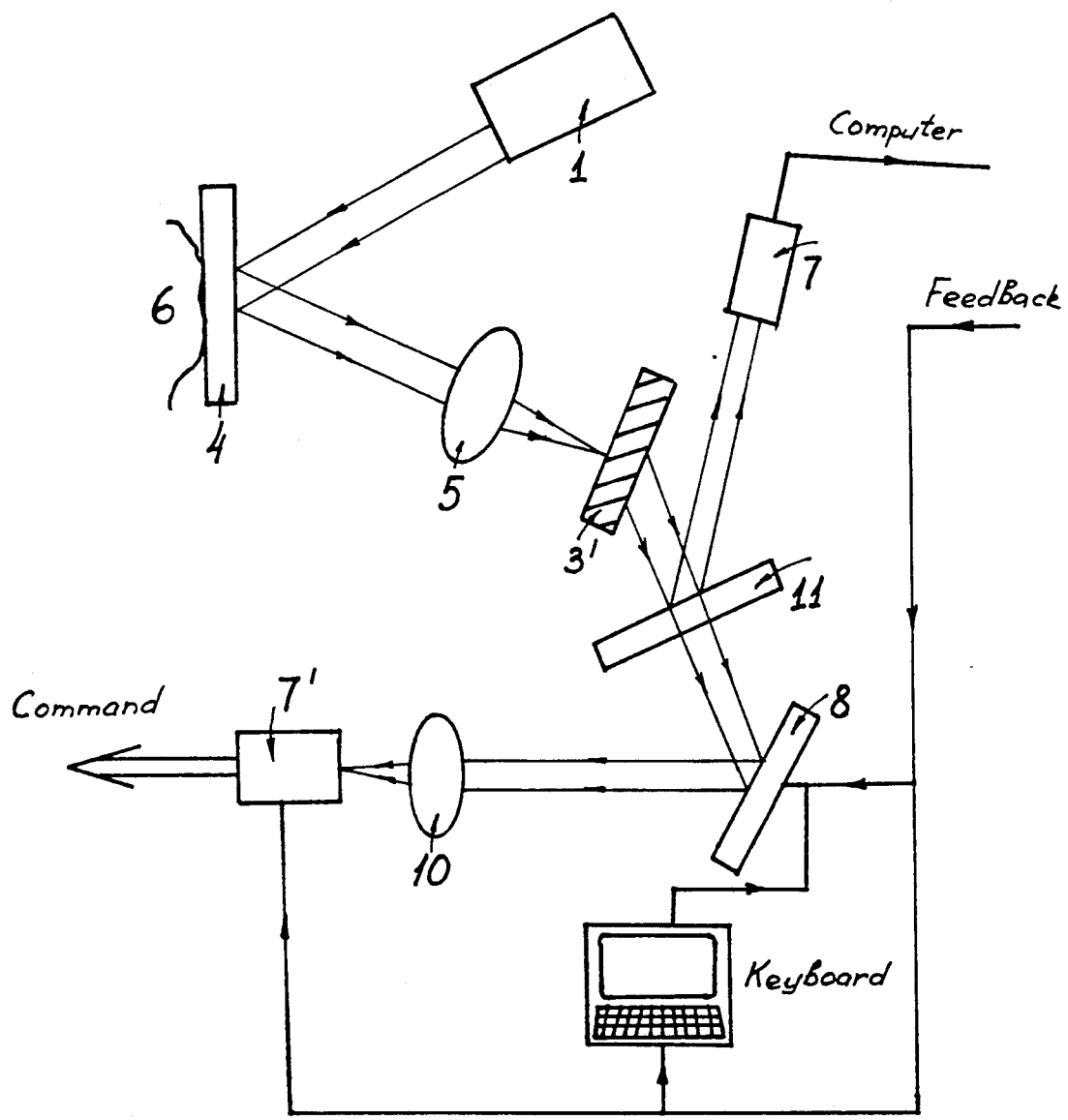
FIG. 5 illustrates schematically an embodiment of the approving system which employs the triple authentication features utilizing the inner graphical input element.

To provide the means of said comparison, the system with different second input element 8 is also claimed (see FIG. 5). Also being connected to the bank computer, this claimed system is secure enough independently—so the communication lines to the computer are not necessarily required and are shown on FIG. 5. by the dotted lines.

This triple-level modification includes: 1-laser, 3-"generalized" matched filter, 4 and 8'-input elements (transparent windows), 5 and 10-spherical lenses, 6-finger, 7-photoelement, with output connected to the control device, and 9-rotating lid.

Here the input element is external and is realised as the second transparent window 8', being situated on the path of the optical beam co-axically. This window possesses lines/grooves for angular orientation of the additional graphic information (in this particular case, the signature of the user or his personal digital code, for instance).

To this window the movable lid 9 is attached. This lid has a triangular cross-section with an arbitrary angle and a mirrored outer surface. Following the input element 8, along the optical path of the beam, the standard spherical lens 10 is located. The angular space orientation of the latter's optical axis corresponds to the arbitrary (but fixed) angle of the lid 9. In the back focal plane of this lens 10 on its optical axis the standard photoelement 7' is located.

This triple-level device, using the generalized matched optical filter and applying the two-stage Fourier optical recognition procedure, functions in the following way.

a) Without the computer's approval

In actual operation the user writes down his signature on the second input element 8 along the pre-positioned lines/grooves, then closes the lid and presses his finger to the window 4. If the digital sheltering information is used, the said window can include even thepre-grooved net—for better positioning the figures. The lid 9 becomes locked until the credit card returned. Locking the lid prevents the unauthorized person from reading the sheltering information, which will appear if the imprint of the fingerprint is forged After this the user inserts his card and realises the procedure as in the first modification.

The first stage of said recognition procedure is absolutely the same as in the single stage approvement device, having been described earlier. After the fingerprint is approved (and only in that case), the image of the graphical sheltering information will appear on the inner plane of window 8. It should be noted here that the angular orientation of said information's reconstructed image depends on the orientation of the generalized matched optical filter only and is absolutely unaffected by the rotational movement of the finger during the first approval stage. After the first approval stage, the second identification image exactly fits angularly the lines on the second window 8. To provide the assured recognition on the second stage, angular discrepancies within the range of 10 degrees are absolutely allowable.

In some modifications of the device under discussion the user might be provided with possibility to check that the first stage is finished (his fingerprint is approved) by opening the lid 9 and checking if the image of his signature has appeared. After the approval of the first stage, the correlation light beam, already carrying the information about the sheltering information reflected from the mirrored surface of the lid 9. In the reflected beam the information about the said information, having been written down manually on second input element 8 is multiplicatively superimposed on the image of the first one. After passing the lens 10, both images are correlated by their corresponding Fourier spectra, the correlation signal to appear on the surface of the photodetector 7.

Fourier spectrum comparison is chosen and implemented because its results are unaffected by the relative linear dimensions: to be approved the initial (in the generalized matched filter) and written down signatures need not linearly match exactly. The very important feature of this structure is that on the second stage of approval, the corresponding images are multiplied and not added.

B) With the computer's approval

The system is structurally the same, but non-linearly combines all prediscussed features. Here only the electricall direct and feedback connections are supplied to the command device and the lid.

The steps of its functioning are itemized below.

Suggested approvement procedure is simpler (and faster) than the one used in standard DNT. For better understanding it is explained below in great detail. The said, not necessarily unique procedure, comprises of the following steps. (The approving devices, possessing the features of standard DNT is chosen—for illustration purposes only).

1. The user inserts his credit card in the DNT and rotates his finger until the Fourier-spectra will angularly coincide.

2. The approvement signal, if any, in the form of the reconstructed reference beam appears on the surface of photodetector (matrix) and is directed consequently (or—parrallely in time) to the bank computer. The main resulting advantage is that the standard existing communication lines (phone) are used, the volume of approvement information being negligibly small (4 digits).

3. Computer compares the recieved information with the prestored one and produces the decision.

4. If approvement information seems for the computer not to be valid enough, the feedback signal is being generated and automatically directed from the computer to DNT.

5. Then the card is being returned and the user is being informed—in the standard way. For inst. on the second input window the sign "supply more information" appears.

6. The user writes down the graphical information (signature) or digits of his personal code on the second input window. In the case of digits being used, the said window can additionally hold the digits grid—to simplify the process.

7. Then the user closes the lid (and it becomes automatically locked), inserts his card and rotates the finger. The demand for additional information can be stored, or—procedure repeated, the time of first recognition step being negligibly small 8. Then by his own demand the computer directs optically the information in reconstructed reference beam (the beam itself) to the second input window. In real procedures, the information, being sent to computer can include 8-11 digits, corresponding to the standard account number, while, the number of digits being sent for the second approval should hold about four only.

Such number is quite enough for additional approval, is easy to remember, and is accustomed: the same number being used in existing common procedures for DNT.

9. After the second step of approvement is finished (if any), the peak signal from the second photodetector is being sent to computer, and in parallel—to unnlock the said lid.

10. Then the card is finally approved, transaction concluded card returned, and the lid unlocked.

The itemized procedure is fully automatic up to the extracting the demanded sum from the account.

In case of forged card—the card is not returned, the alarm signal generated, corresponding measures taken.

Additional advantage of this system is that it being used in combination with the existing Bar code counters, which initially use lasers for readout, the physically realisation of the approval devices under claim would demand adding one/two lenses and mirrors.

One should mentioned, that manually written graphical information should be erased after approval.

In the case of the inner input element—display, this information is deleted automatically. Then the second input element (window) is phisycally absent. The additional information appears inside of the approving device in the form of digits on the display and is unaccessible to the outside viewer.

In the latter case, after the demand from computer, the user punches down his personal code, the lid becoming obsolete, the additional information absolutely secure, the procedure itself being realised in the accustomed way.

The most attractive feature of these multi-level holographic credit card approval devices is that all most complicated recognition operations are performed by optical processing without involving the electronic processing techniques of any level, thus excluding both the additional time-lapses and/or errors.

Said sophisticated multi-level devices are intended for very special applications, requiring the very high security level., though even for the most sophisticated modifications the system and the procedures are simpler, than the existing ones.

Some derivative consumer applications should be additionally noted. Described above system and procedures can ideally suit the standard purposes of payments in restaurants, and for approving card-purchases by phone.

In the first case the user is approached with the "tray"including the said approval device and the slit for card presentation. In use he himself introduces the card and approves the bill. In this case the card stays in his possession during full procedure. The said tray is absolutely self-consistent and can additionally include the printing device (for receipt) and standard RAM-element—for accessing the master computer.

In the case of card-purchase phone approval the corresponding phone is being suggested. The said phone should include the said approval device and the slit for the card also. The card can be approved by the owner only, and in this one the said sheltering information is automatically directed through the phone line to the master computer, the procedure of purchasing becoming absolutely automatic.

It should be noted that while using the generalized holographic filter, more elaborate information—analog or digital up to any degree of complexity—can be implemented. However, in all the lower level security applications the incorporation of more elaborate information is not needed. The suggested technique, especially the two-staged modification, already provides the needed level of security.

Forging of the claimed card with multi-level approvement can be realised only while possessing the access to the memory of bank computer. But in such case funds can be extracted in the easier way—through the said DNT directly.

What is claimed:

1. A banking system, utilizing the existing communication channels and the holographic angular-invariant credit card with self-authoriztion and authentication, wherein at a command signals is produced when authorized user presents unique identification to the approval device, the latter comprising:
   an input element for angular invariancy in the form of a transparent window against which the user presents the unique identification and rotates it for angular alignment with the said identification previously stored in form of hologram,
   a matched optical filter in the credit card upon which the unique identification of said authorized user is stored in a Fourier holographically encoded form, or in the form of Fourier-hologram;
   means for illuminating said unique identification with coherent beam at said transparent window;
   means for projecting upon said optical matched filter the reflected beam of said coherent light having been encoded by said unique identification at the window; and
   means for focussing and registering the correlation signal being formed in the process of comparing the stored indentification with the presented identification during rotation, and for generating the command signal only when the correlation signal is unambiguously present;
   a communication line to the bank computer,
   means for pre-storing of the identification in the said matched optical filter, the latter being produced in the form of a generalized hologram,
   means of comparing the sheltering information, being prestored in the said "generalized" hologram in the computer,
   means of providing the command feed-back signal from the computer.

2. The banking system of claim 1 further having a second stage of authentication, comprising
   a second transparent window upon which the aurthorized user presents a second identification,
   a lid rotatng in the plane, perpendicular to the axis of the correlation beam propagation, fixed to the said window and possessing a triangular cross-section with a mirrored outer layer, the angle of the said cross-section being related to the said second window position,
   means for pre-storing of the second identification in the said matched optical filter, the latter being produced in the form of a generalized hologram,
   means for focussing and registering the correlation in the said matched optical filter, the latter being produced in the form of a generalized hologram,
   means for focussing and registering the correlation optical signals of the said presented second identification with the said stored second identification and for forming the command signal .

3. The banking system of claim 2 further having a second stage of authentication, wherein the second input element is realized in the form of computer display.

4. The banking system of claim 2 wherein specifically aligned grooves, corresponding to the said matched optical filter's in-plane orientation, are placed on the second transparent window.

5. The banking system of claim 2 wherein specifically aligned digit grid, corresponding to the said matched optical filter's in-plane orientation, is placed on the second transparent window.

6. The banking system of claim 2 further having a third level of authentication, wherein the connection for the feedback signal from the computer to the lid and command device are provided.

7. A banking system or claim 1 further comprising:
   information formed in the said credit card a unique identification in the form of a Fourier hologram of the person authorized to activate the said approval device;
   means for illuminating the presented unique identification with coherent light, which is then reflected onto the Fourier hologram,
   means for continuously in time comparing said angular randomly oriented presented identification with said hologram, and generating a command signal when the correlation signal sis present between the presented identification and its said matched optical filter,
   means for storing the second identification, being supplied by the computer memory in the reference beam of the said matched optical filter, thus forming the generalized matched optical filter
   means for illuminating the second transparent window with the first correlation optical signal, that possess the reconstructed said pre-introduced second identification, only in the case that the first-step authentication is present,
   means for introducing the second identification on the second transparent window,
   means for closing the rotating mirrored lid,
   generating the command signal when the correlation signal of the second authentication is present.

8. The system of claim 7 for activating a two-stage holographic credit card approval device after the optical correlation signal verifying the first authentication step is being formed, further comprising the step of introducing the second identification to the inner input element in the form of said display by the use of standard display keyboard.

9. The system of claim 7 further comprising:
   means for introducing the holographic credit card into the input slot of said approval device and fingerprint to the first input element of the said device,
   means for optically forming the correlation first-step signal, directing said signal to the computer memory,
   means for comparing the said signal by computer mens with the stored one and forming the decision,
   means for introducing the second identification to the said second input element,
   means for locking the said element,
   means for introducing the card and the fingerprint,
   means for repeating the first two stages and realizing optically the third state,
   means for producing the resulting command signal,
   means for unlocking the lid, returning the card and concluding the transaction.

* * * * *